United States Patent
Reime

[19]

[11] Patent Number: 5,521,649
[45] Date of Patent: May 28, 1996

[54] TRANSMITTING DEVICE OF A PREDETERMINED TRANSMISSION BANDWIDTH, WITH AN ANTI-DISTORTION DEVICE CONNECTED DOWNSTREAM

[75] Inventor: Gerd Reime, Schömberg, Germany

[73] Assignee: Nokia Technology GmbH, Pforzheim, Germany

[21] Appl. No.: 215,318

[22] Filed: Mar. 21, 1994

[30] Foreign Application Priority Data

Mar. 23, 1993 [DE] Germany .......................... 43 09 351.5

[51] Int. Cl.⁶ .................................................. H04N 5/21
[52] U.S. Cl. ........................................ 348/625; 348/630
[58] Field of Search .................................... 348/627, 630, 348/631, 625, 627, 628, 629, 607, 914, 909, 470

[56] References Cited

U.S. PATENT DOCUMENTS

| | | |
|---|---|---|
| 4,758,891 | 7/1988 | Hitchcock et al. . |
| 5,177,600 | 1/1993 | Monta et al. ............... 358/37 |
| 5,179,438 | 1/1993 | Morimoto .................... 358/17 |
| 5,293,541 | 3/1994 | Ito ............................. 348/625 |
| 5,329,316 | 6/1994 | Kang ......................... 348/625 |

FOREIGN PATENT DOCUMENTS

| | | |
|---|---|---|
| 0263617 | 4/1988 | European Pat. Off. . |
| 0302500 | 2/1989 | European Pat. Off. . |
| 3204191 | 8/1982 | Germany . |
| 4039122 | 6/1991 | Germany . |
| 4132508 | 4/1993 | Germany . |
| 4215007 | 11/1993 | Germany . |
| 2144302 | 2/1985 | United Kingdom . |
| 2213022 | 12/1988 | United Kingdom . |

OTHER PUBLICATIONS

"Equalizer Calculations for Amplitude and/or Frequency Parameters in TV Cable" by Evnevich–Checkan in: Elektro, Bd 26, 1972. H.2, S.6–12.

Primary Examiner—Victor R. Kostak
Attorney, Agent, or Firm—Ware, Fressola, Van Der Sluys & Adolphson

[57] ABSTRACT

An anti-distortion device, connected downstream of a transmitting device (2) with a determined transmission bandwidth for transmitting a input signal (Se) with signal jumps (3), wherein the delay time (Tv15) of the delay element (15) is such that the front slope (24) of the detection signal (S18) of the second signal jump detector (18), produced when a slope (4) of the useful signal (Sa1) is detected, is at least partially located in the time range (T25) of the trailing edge (25) of the corresponding detector signal (S17) of the first signal jump detector (17), that the delay time (Tv11) of the delay element (11) is equal to half the period (T5) of the overshoot (5) superimposed on the useful signal, and following the signal slope (4) of the transmitted signal (Sa1), and that the delay element (10) is connected between the output (1) of the transmitting device (2) and the input (11.1) of the delay element (11).

10 Claims, 4 Drawing Sheets

TRANSMITTING DEVICE OF A PREDETERMINED TRANSMISSION BANDWIDTH, WITH AN ANTI-DISTORTION DEVICE CONNECTED DOWNSTREAM

TECHNICAL FIELD

The invention concerns an apparatus for improving the rise time of a high frequency signal.

BACKGROUND OF THE INVENTION

The invention relates to a device for transmitting color television signals, which contains a luminance signal, and at least one color signal assigned to the luminance signal for transmission. Such a device is described in patent application DE-A1 42 15 007, not published before the priority date of this invention. The professional can find an interference suppressing device in the unpublished publication, which is located in a transmitting device for transmitting the chrominance in a color television signal. The interference suppressing device contains a delay line in the transmission path of the chrominance signal, where one end of an signal fade over circuit is connected to the input, and the other end to the output in such a way, that in both end positions of the signal fade over circuit the input or the output of the delay line is directly connected to the output of the signal fade over circuit. The signal fade over circuit may be a switch or an electronic potentiometer and is controlled by a control signal that oscillates around a zero line, and which has two opposing semi-oscillations, and crosses the zero line with a steep zero passage between the two semi-oscillations. This zero passage defines an instant of a detection device that consists of two signal jump detectors and a signal subtracter. According to the publication, each signal jump detector consists of a delay line and a differential amplifier connected on the input side between the input and the output of the delay line, and whose output is connected to one of the signal subtracter inputs. The delay time of both series-connected delay lines of the two signal jump detectors is designed, so that it is an odd-numbered multiple of half the oscillation time of the color carrier oscillation of the transmitted color signal on one side, and is slightly larger on the other side than the largest anticipated rise time of the color signal slope, namely the time of the phase change of a first color phase to a second color phase corresponding to the color carrier signal. In the cited publication, the length of the delay time is oriented exclusively to the type of transmission of a color signal or signals in a color television transmission, namely to the transmission of the color by the phase of a color carrier oscillation of a predetermined, constant frequency. A delay element, connected upstream of the interference suppressing device, only produces a time coordination between the transmitted luminance signal and the colors of the transmitted color television signal. Other signals with flattened transitions which must be transmitted, are not considered in the design of the delay line time in both the signal fading over and the signal jump detection.

When a jump edge of a signal is transmitted in a transmission system or in a transmitting device with a limited bandwidth, not only is the jump edge flattened in a signal slope of a clear slope period, which is about half the period of the bandwidth frequency of the transmitting device, but additionally an overshoot follows the flattened jump edge, and grows out of the signal slope. This overshoot, which is superimposed on the transmitted signal, has nearly the same frequency as the bandwidth of the transmitting device, and can lead to considerable interference in the jump edge with the information transmitted by the signal. Thus, in the transmission of sound, high-frequency sound noises are thereby heavily discolored or distorted, or interfering edge echoes, so-called ringing, takes place in the vertical luminance edges of a video transmission, because of the distortion effect.

U.S. Pat. No. 4,758,891 discloses a method and apparatus for improving the rise and fall time of a video signal using an undelayed signal, a delayed signal and a further delayed signal.

The edges of a video signal are sharpened by switching the output furnishing the sharpened signal in sequence first to receive a signal delayed by a greater amount, i.e. a signal which has not as yet undergone transition, and, secondly, to receive a signal delayed by a lesser amount, i.e. one that has already completed the transition. The rise time of the affected edge thus depends only on the time required to switch from one terminal to the next. The same switching sequence is carried out regardless of whether the transition is a negative going or positive going transition.

Since the system of the U.S. Pat. No. 4,758,891 uses an electronics witch which is switching between two time delay lines the output signal is most of the time delayed.

In the case of using this system for regenerating of video luminance signal the video chrominance signal must be delayed also. That makes the solution expensive when realized in an integrated circuit for example in a video processor.

SUMMARY OF THE INVENTION

The invention has the task of designing and elaborating upon the anti-distortion device mentioned above so that it becomes suitable for the transmission of signals with jump-like information changes, and so that the interference from overshoot after such information changes can be eliminated.

The delay time of the delay elements in the anti-distortion device is such, that the front slope of the detection signal of the second signal jump detector, which is produced when a rise slope of the transmitted signal is detected, is at least partially in the time range as the rear slope of the corresponding detection signal of the first signal jump detector, which causes the switching of the transmitted signal from the output to the input of the second delay element to take place as fast as possible and without any time interruption within a constant, predetermined period of time. This applies to all types of signal jump detectors, whose detection signals are more or less bell or trapeze-shaped and also exhibit slopes of finite steepness. For example, such signal jump detectors are differentiators.

Of particular advantage are signal jump detectors with a delay element and a signal subtracter, whose one signal input is connected to the delay element input, and the other input is connected to the delay element output, and the period of the delay element lies within the size of the slope period of the slope produced by the jump edge of the transmitted signal. In that event, the two crossing slopes of both detection signals are always optimized for producing a control signal with an optimum zero passage.

The required delay period of the signal delay element is such that the delay time is equal to one half the period of the overshoot following the slope of the transmitted signal, and is superimposed on the transmitted signal, so that in the center position of the signal fade over circuit, the interfering overshoot cancel each other out, and no longer adulterate the transmitted information.

It is not necessary to construct the delay elements of the anti-distortion device only as delay elements or as lag elements. Rather, other delay elements can be used for this purpose, in simple cases even low-pass or high-pass circuits, or integrated circuits can be used. The following invention will be explained in more detail by means of some particularly advantageous configuration examples. The description of these examples, however, does not limit the scope of the invention, but only represents advantageous excerpts from the scope of the invention.

DETAILED MODE FOR CARRYING OUT THE INVENTION

Figure 1:
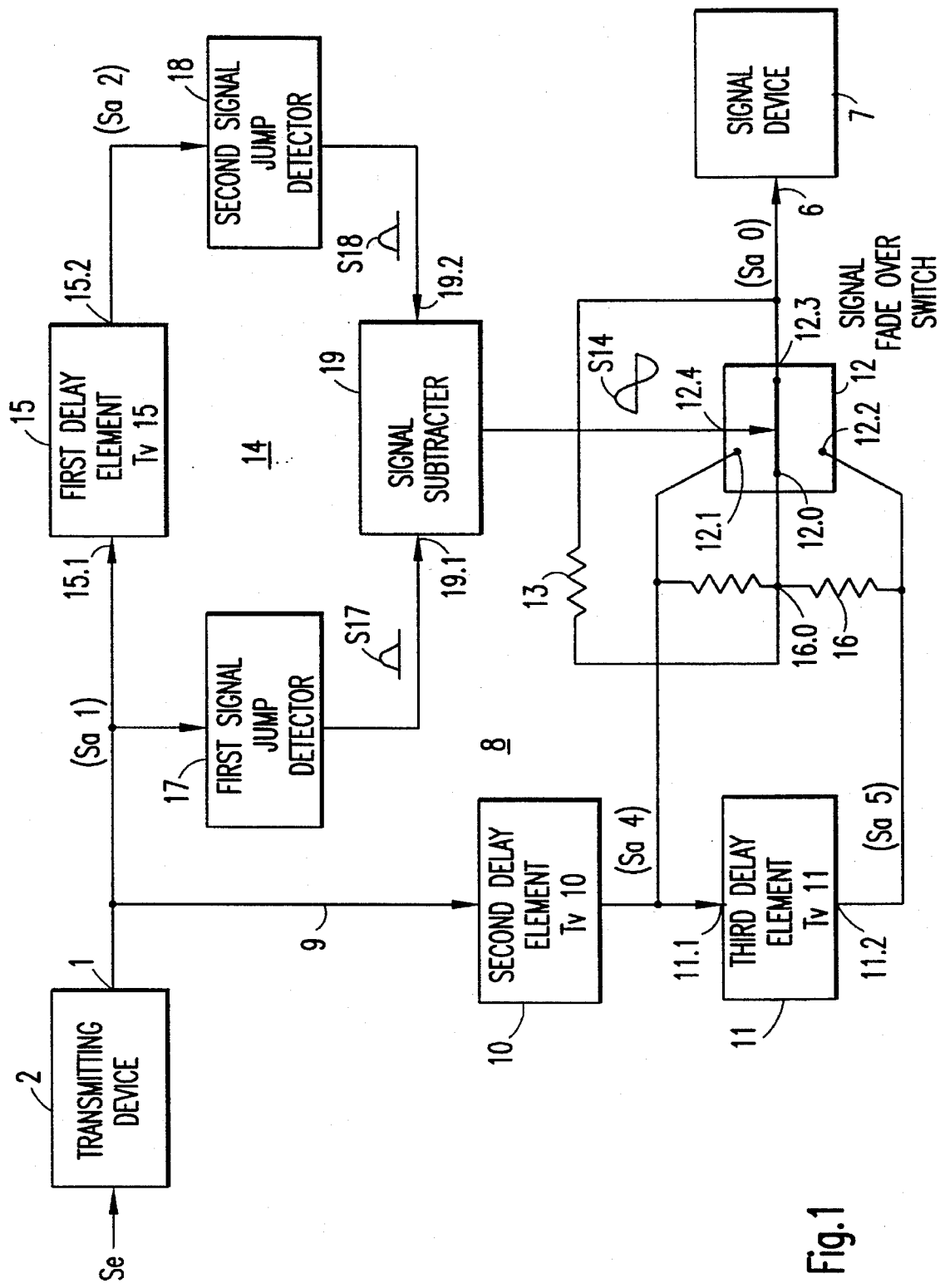
FIG. 1 is a block diagram of an anti-distortion device inserted into a transmission path.

FIG. 1 depicts a block diagram of an anti-distortion device 8, which is connected to output 1 of a transmitting device 2. The transmission of an input Se by the transmitting device 2 distorts a signal jump 3 of the input signal Se, shown abridged in diagram a) of FIG. 2, in such a way, that the signal jump 3 of input signal Se is transformed at output 1 during the transmission of device 2, into a rising slope 4 with a slope period T4, which is about equal to half the period T2 of the frequency transmission bandwidth B2 of transmitting device 2, with an attenuated overshoot 5 connected thereto, which is superimposed on the useful signal, and whose oscillation period T5 is equal to the period T2 of the frequency transmission bandwidth B2 of the preceding transmitting device 2. To partially or fully correct the distortion of input signal Se, which occurred during the transmission, an anti-distortion device 8 is connected between the output 1 of transmitting device 2 and the signal input 6 of an extending signal device 7. Device 8 contains a signal transmission path 9, with a delay element 10, a delay element 11 and a signal fade over circuit for example a three-position signal switch 12. The first end position 12.1 of signal switch 12 is connected to the input 11.1 of the delay element 11, and one end of a resistor circuit 16, and the second end position 12.2 of the signal switch is connected to the output 11.2 of delay element 11 and to the other end of the resistor circuit 16. The central position 12.0 of the signal switch, which is simultaneously the idle position of signal switch 12, is connected to the central tap 16.0 of resistor circuit 16. A resistor 13 is located between the central tap 16.0 and the output 12.3 of signal switch 12, whose resistance value is significantly larger than that of the resistor circuit 16, to prevent signal interruptions during the switching processes of the signal switch.

The signal switch 12 is controlled by a signal S14 from a control device 14 in the anti-distortion device 8, at control input 12.4. The control device contains a delay element 15, which is also connected to the output 1 of transmitting device 2, while a first signal jump detector 17 is connected to its input 15.1, and a second signal jump detector 18 is connected to its output 15.2. In the illustrated configuration example, the signal jump detectors 17 and 18 are circuit installations that differentiate signals, which form a differential derivative dS/dt from an input signal S, thus producing approximately bell or trapeze-shaped output signals S17 and S18, which are respectively routed to inputs 19.1 and 19.2 of a signal subtracter 19. By means of subtraction, the signal subtracter 19 produces the control signal S14 from both detection signals S17 and S18, for control of the signal switch 12.

Figure 2:
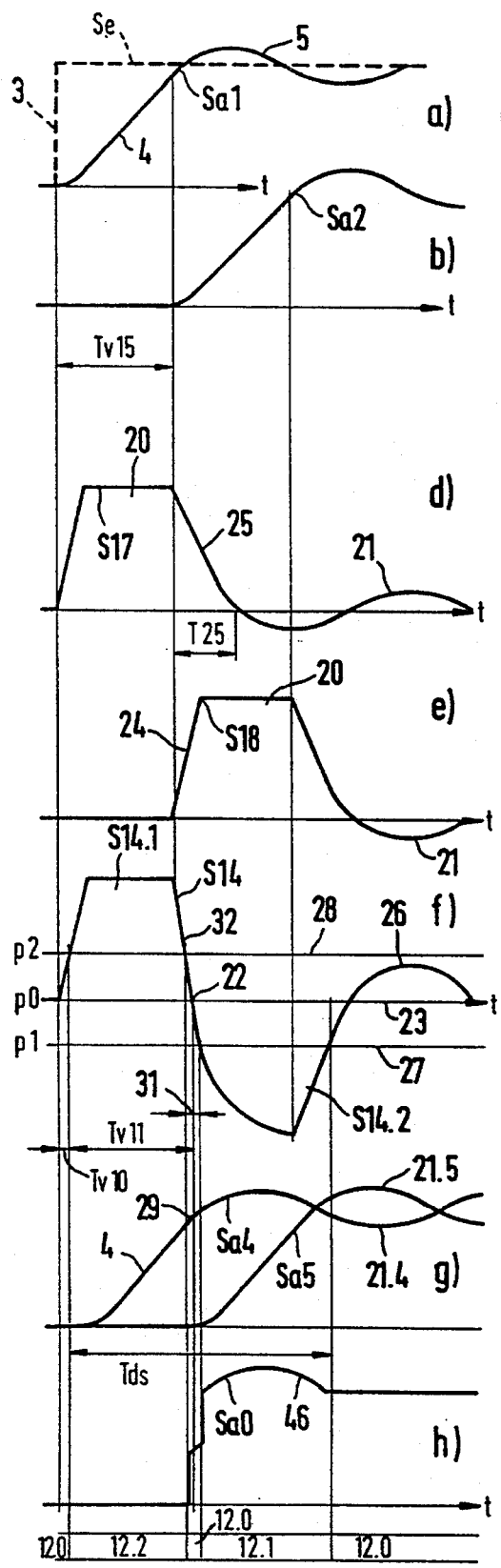
FIG. 2, comprising diagrams a) to i) illustrate the signals produced by the function process of the devices shown in FIG. 1.

The operation and the design of the delay elements, which are delay elements in the configuration example depicted in FIG. 1, are explained in more detail for the anti-distortion device shown in FIG. 1, by means of signal diagrams a) to h) in FIG. 2. Diagram a) is a section of an input signal Se to be transmitted, which contains a voltage jump 3 in this section, and also contains the respective section of the output signal Sa1 at the output 1 of transmitting device 2, after transmission of the signal Se from the input to the output 1 of transmitting device 2. This transmission distorts the useful signal Se on the input side in such a way that it contains a signal slope 4 at the output 1 of transmitting device 2, in the area of jump edge 3, which changes into an attenuated overshoot 5 that is superimposed on the useful signal. This output signal Sa1 is present at both the input 15.1 of delay element 15 and the input of delay element 10, and is transmitted by delay element 15 as the delayed signal Sa2 (diagram b)) to the input of the second signal jump detector 18 of anti-distortion device 8. In the illustrated configuration example, both signal jump detectors 17 and 18 are constructed as signal differentiators, which produce a detection signal S17 and S18 from the applicable signal sections Sa1 and Sa2 by means of differentiation, as shown in diagrams d) and e), and contain a trapeze-shaped pulse 20 in the area of the differentiation of signal slopes 4 at the input of the signal jump detectors, with a front and a rear slope, and an oscillation 21 that corresponds to the attenuated over-shoot 5, and which is connected thereto. These detection signals S17 and S18 are routed to inputs 19.1 and 19.2 of signal subtracter 19. The latter forms an output signal by subtraction of the two detections signals S17 and S18 displaced in time, which is routed as the control signal S14 to input 12.4, for control of the signal switch 12, and is shown in diagram f). This control signal essentially consists of a first semi-oscillation S14.1, and a second semi-oscillation S14.2 that is opposite to the first semi-oscillation, and oscillates with a steep zero passage slope 32 located between both semi-oscillations, at a zero passage 22 around a zero line 23, which corresponds to an idle level p0 of the control signal S14. During this idle level p0, the signal switch controlled by signal S14 is placed in an idle position corresponding to the central position 12.0 of the signal switch.

The delay time Tv15 of delay element 15 is adjusted or designed, so that at least part of the front slope 24 of pulse 20 of the detection signal S18 lies within the time period T25 of the rear slope 25 of the pulse from detector signal S17. This achieves the steepest, no-cascade zero passage slope 32 possible. Since in many cases the width of slope pulse 20 is about equal to half the period T5 of the attenuated overshoot 5 of input signal Sa1 from the anti-distortion device, and an addition of the attenuated overshoot takes place during the signal subtraction of the two detection signals S17 and S18 because of the shift of half an oscillation period, it is an advantage to design the delay period Tv15 of delay element 15 within the cited time period T25 in such a way, that it is about one or three quarters of the period T5 of the attenuated overshoot, and thereby the sequential oscillations 26, which are connected to both semi-oscillations of control signal S14, caused by the attenuated oscillations 21 of detection signals S17 and S18, are not significantly amplified, and do not adversely affect the control of signal switch 12.

Diagram f) of FIG. 2 shows the switching levels p0, p1 and p2 of the control signal S14 represented by the zero line 23, line 27 and line 28. If the value of control signal S14 is larger in the negative direction than the first switching level p1, signal switch 12 is set to position 12.1, in which it transmits the signal Sa4 to be undelayed by signal delay element 11 to the output 12.3 of the signal switch. The signal Sa4 is shown in diagram g). If the value of control signal S14 is larger than the positive switching level p2, then the signal switch is set to position 12.2, in which it switches signal Sa5, which is delayed by the signal delay element 11 to output 12.3. The delay time Tv11 of signal delay element 11 is designed to be equal to half the period T5 of the attenuated overshoot 5, which connect to the slope 4 of the signal Sa1 transmitted by device 2, and are superimposed on the useful signal. In the central position 12.0 of signal switch 12, the attenuated overshoot 5.4 and 5.5 of both transmitted signals Sa4 and Sa5 are almost entirely eliminated thereby.

The delay time Tv10 of delay element 10 in the signal path 9 of anti-distortion device 8 is adjusted in such a way, that the end 29 of signal slope 4 of the signal Sa4 which is undelayed from delay element 11, or the start 30 of the delayed signal Sa5 from the delay element 11, is within the time range 31 of zero passage slope 32 of control signal S14. In that way, when the control signal S14 depicted in diagram f) of FIG. 2 occurs during its first semi-oscillation S14.1, the signal Sa5, located at the output 11.2 of signal delay element 11, and, during its second semi-oscillation S14.2 following the zero passage 22, the signal Sa4 located at the input 11.1 of signal delay element 11, is transmitted to the signal device 7. The signal Sa0, produced thereby at the output 12.3 of signal switch 12, and which is corrected and transmitted by anti-distortion device 8, is schematically shown in diagram h). Bar graph chart i) schematically depicts the positions of signal switch 12. In the depicted detection range Tds of signal slope 4, the starting signal Sa0 of anti-distortion device 8 first follows the path of signal Sa5, which is delayed by signal delay element 11, and then, during the zero passage 22 of control signal S14 it follows approximately the path of zero passage slope 32, and during the subsequent second semi-oscillation S14.2 of the control signal, the path of the signal Sa4 to be transmitted, located at the input of signal delay element 11. Accordingly, the further path of output signal Sa0 of the anti-distortion device 8 is determined for combination of the signals Sa4 and Sa5 located at the input and output of signal delay element 11, which nearly eliminates the overshoot 21.4 and 21.5 of signals Sa4 and Sa5, located in the opposite phase. In the depicted configuration example, the switching levels p1 and p2 of signal switch 12 are adjusted so that they cannot be reached by the overshoot 26 of control signal 14.

Figure 3:
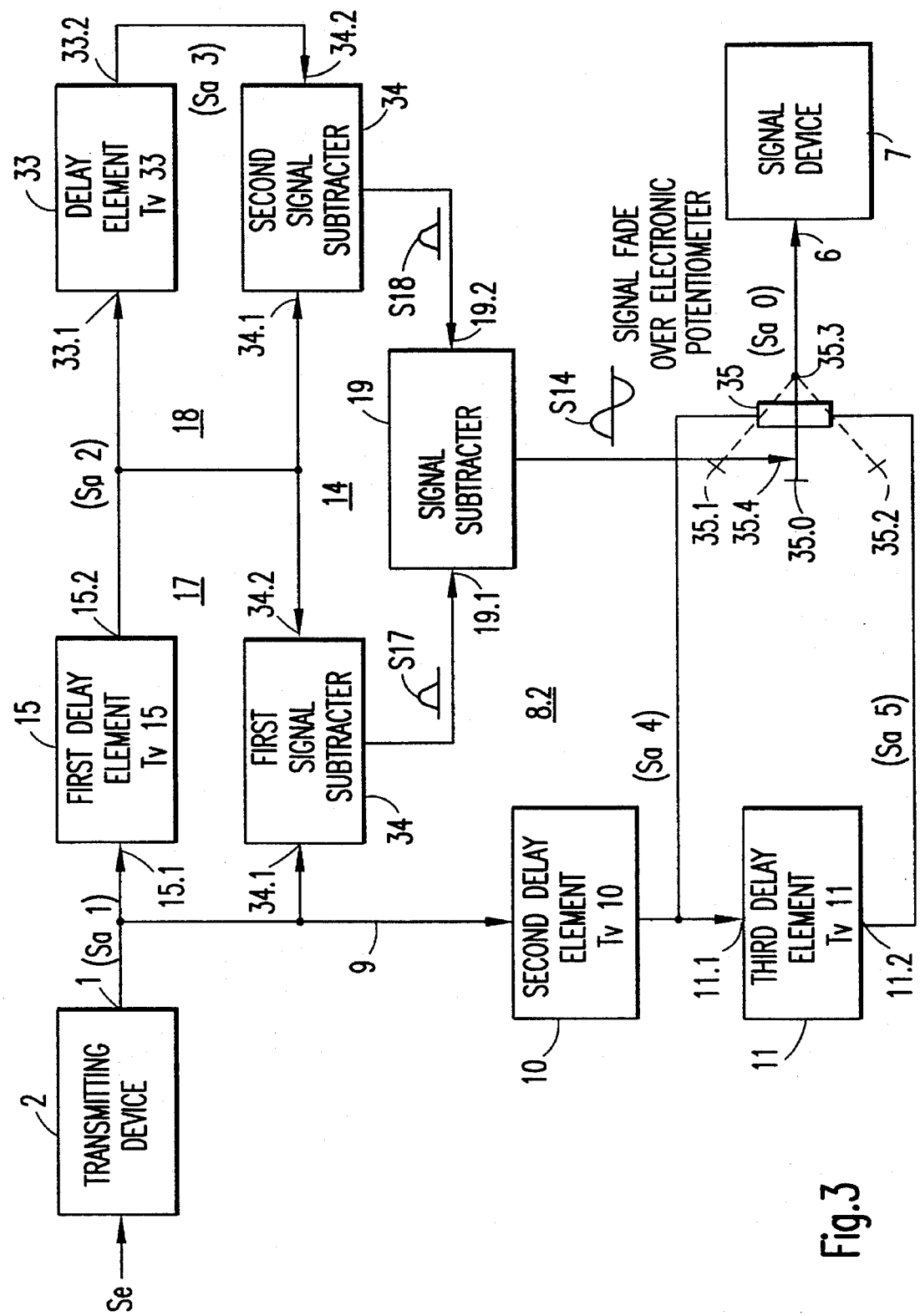
FIG. 3 is another block diagram of an anti-distortion device inserted into a transmission path.

FIG. 3 illustrates another configuration example of an anti-distortion device 8.2, which essentially differs from the anti-distortion device 8 shown in FIG. 1 in that each of the detectors 17 and 18 consists of a delay element 15 or 33 and a subtracter 34, and that the signal fade circuit 12 represents a controllable electronic potentiometer 35. The corresponding blocks in FIGS. 1 and 3, and the corresponding signals in the diagrams of FIGS. 2 and 4 have the same reference numbers.

In each of the detectors 17 and 18 depicted in FIG. 3, one input 34.1 of signal subtracter 34 is connected to the input 33.1 of delay element 15 or 33, and the other input 34.2 of the signal subtracter is connected to the output 33.2 of the delay element. In the configuration example illustrated in FIG. 3, the characteristics of delay element 33 are identical to the delay element 15.

Figure 4:
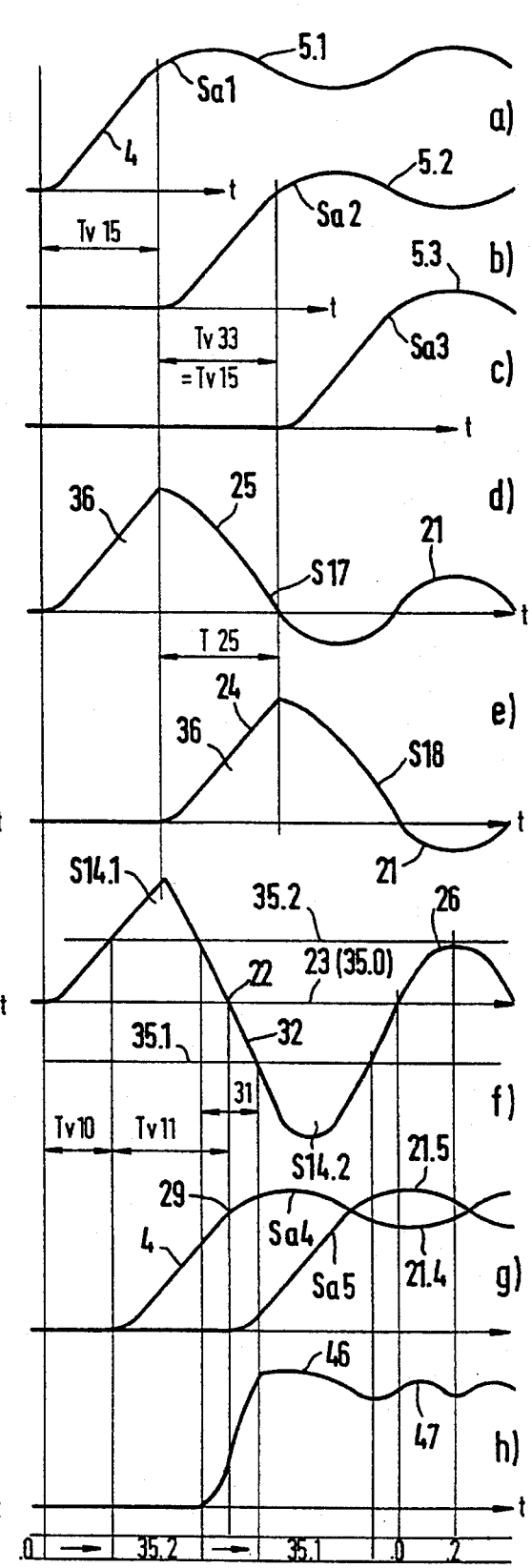
FIG. 4, comprising diagrams a) to i) illustrate the signals produced by the function process of the devices shown in FIG. 3.

Diagrams a) to c) in FIG. 4 successively represent the undelayed output signal Sa1, the output signal Sa2 delayed in delay element 15, and the output signal Sa3, which is double delayed in delay element 33, are each depicted with an attenuated overshoot 5 connected thereto. Diagrams a) and b) of FIG. 4 correspond to diagrams a) and b) of FIG. 2. The slope detectors 17 and 18 form detection signals S17 and S18 from two adjacent signals Sa1 and Sa2, and Sa2 and Sa3, which, in the area of signal slopes 4 of the compared signals (e.g. Sa1 and Sa2), have a triangular slope pulse 36 and, in accordance with the signals of diagrams d) and e) in FIG. 2, have a connecting attenuated overshoot 21, which are depicted in diagrams d) and e) of FIG. 4. Because the delay time Tv15 or Tv33 of delay elements 15 and 33 is located within the value range of period T4 of signal slope 4, produced by a signal jump 3 of an input signal Se through the transmission in transmitting device 2, the front slope 24 of pulse 36 of slope detector signal S18 from the second slope detector 18 is always fully within the time range T25 of rear slope 25 of pulse 36 of detector signal S17 from detector 17, so that the control signal S14, formed in the signal subtracter 19 from the two detector signals S17 and S18, and shown in diagram f) of FIG. 4, contains an optimum zero passage slope 32 between the two opposite semi-oscillations S14.1 and S14.2. Since an addition of the amplitudes of the attenuated overshoot 5 to the overshoot 21 takes place in all signal subtracters 34 and 19, and an addition of the overshoot 21 to the sequence oscillation 26 of control signal S14, the amplitude of the attenuated overshoot 26 of the control signal S14 in the configuration example illustrated in FIG. 3, is relatively large.

In the idle position, the controllable, electronic potentiometer 35, which is connected by its ends 35.1 and 35.2 between the input 11.1 and the output 11.2 of the delay element 11, since no signal or the idle level p0 of a control signal S14 is present at its control input 35.4, is in its central position 35.0, in which the potentiometer 35 transmits the signal Sa4 at the input of delay element 11, and the signal Sa5 at the output 11.2 of the delay element, in equal parts to the output of the anti-distortion device 8.2. At the level p1 and p2 of control signal S14, drawn in diagram f) of FIG. 4, the controllable electronic potentiometer 35 is set to its end positions 35.1 or 35.2, in which it either transmits signal Sa4 at the input 11.1, or signal Sa5 at the output 11.2 of the delay element, to the output 6 of the anti-distortion device 8.2.

In the illustrated configuration example, the relatively large overshoot 26 of control signal S14 connected to the second semi-oscillation S14.2, are also transmitted to the input 35.4 of the controllable electronic potentiometer 35, and almost fully control the potentiometer in the depicted configuration example. This causes an attenuated overshoot 47 in the useful signal Sa0 at the output of the anti-distortion device, with double the frequency of overshoot 5 of signal Sa1, instead of the overshoot with the frequency of overshoot 5 from the transmitted signal Sa1 with lower amplitude. Since the bandwidth of the continuing signal device 7 is generally not larger than that of the earlier anti-distortion device 8, it does not interfere with the overshoot 47 caused by the control during further transmission or evaluation of the output signal Sa0 of anti-distortion device 8.2.

Figure 5:
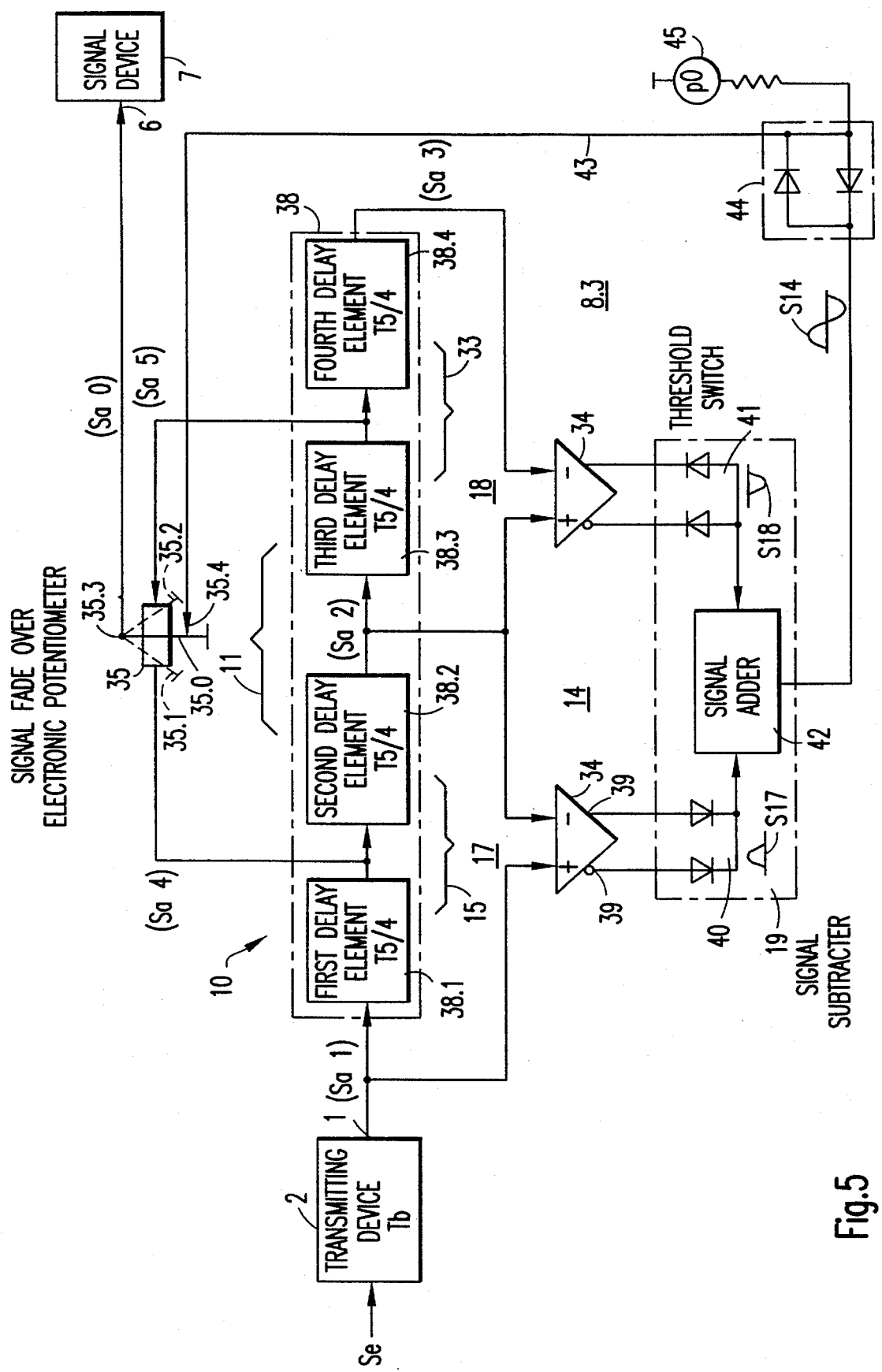
FIG. 5 is a block diagram of an anti-distortion device connected to a transmitting device, with four equal delay elements connected in series.

FIG. 5 shows another configuration example of an anti-distortion device, identified by reference number 8.3 in the drawing, and which is connected into the path of an transmitted signal Sa1. It differs essentially from the anti-distortion device 8.2 depicted in FIG. 3, in that the individual delay elements of the anti-distortion device are incorporated into a chain 38 of four delay elements 38.1 to 38.4, of which the first delay element 38.1 represents the delay element 10 in the signal transmission path of anti-distortion device 8.3, the series connection of the first two delay elements 38.1 and 38.2 represents the delay element of detector 17, and at the same time the delay element 16 of control device 14 of the anti-distortion device 8.3, the series connection of the two central delay elements 38.2 and 38.3 represents delay element 11, and the series connection of the last two delay elements 38.3 and 38.4 represents delay element 33 of detector 18.

The delay period Tv38 of each of these delay elements in chain 38 is equal to one quarter of the period T5 of attenuated overshoot 5, which is connected to the slope 4 of input signal Sa1 of anti-distortion device 8.3, and is superimposed on the useful signal Sa1. Since the period T5 of overshoot 5 is about equal to half the period T2 of the frequency bandwidth B2 of transmitting device 2, this arrangement of delay elements 38.1 to 38.4 in chain 38 achieves both the extinction of the overshoot 5 of signals Sa4 and Sa5, located at the ends 35.1 and 35.2 of the controllable electronic potentiometer 35, for the output signal Sa0 of anti-distortion device 8.3, as well as producing an optimum formation of the control signal S14 produced in control device 14, and setting the time position of the zero passage slope 32 of control signal S14, which is required for the optimum correction of the input signal Sa1 from the-anti-distortion device.

In the configuration example depicted in FIG. 5, the signal subtracters 34 of detectors 17 and 18 are differential amplifiers with inverted outputs 39, which are connected to the two inputs of signal adder 42 through pairs of rectifiers 40 and 41. Together with the two rectifier pairs 40 and 41, the signal subtracter 42 forms signal subtracter 19 of control circuit 14 of anti-distortion device 8.3, because of the different arrangement of the passing direction of the rectifier pairs. In addition, a threshold switch 44 is located in the signal line 43 between the output of signal subtracter 19 and the input 35.4 of the controllable electronic potentiometer 35, which only lets the parts of the control signal S14 of the signal subtracter pass, whose level value is larger than the amount of the blocking level ps of threshold switch 44. This prevents interference signals, such as for example the sequence oscillations 26 in the control signal S14, caused by overshoot 5 in signals Sa1, Sa2 and Sa3, from affecting the control of the controllable electronic potentiometer 35. Furthermore, a high-impedance idle level source 45 is connected to input 35.4 of the controllable electronic potentiometer 35, which maintains an idle level p0 at the input of the potentiometer, when the control signal S14 is missing.

The signal path of the configuration example illustrated in FIG. 5 corresponds approximately to the signal paths depicted in diagrams a) to h) of FIG. 4, except that the output signal Sa0 of the anti-distortion device 8.3 in diagram h) does not contain any other overshoot 47, except for the first accentuation 46.

In another suggestion of a configuration example of the arrangement depicted in FIG. 5, the chain 38 of the series-connected delay elements is a delay element or a lag element with corresponding taps.

I claim:

1. An anti-distortion device (8), responsive to a transmitted signal (Sa1) on a transmission path (9) having an output (6), the anti-distortion device connected downstream of a transmitting device (2) with a limited transmission bandwidth for transmitting a signal (Se) with signal jumps (3), containing:

a control device (14) which contains a first delay element (15) having an input responsive to the transmitted signal (Sa1) and that generates a first delay time (Tv15) on a first delay output signal (Sa2), a first signal jump detector (17) having an input responsive to the transmitted signal (Sa1) and that generates a first detector signal (S17) at an output, and a second signal jump detector (18), having an input responsive to the first delay output signal (Sa2) and that generates a second detector signal (S18) at an output, and a first signal subtracter (19) with a first input (19.1) connected to the output of the first detector (17) and with a second input (19.2) connected to the output of the second detector (18), that generates at an output a control signal (S14) represented by an oscillation (S14.1, S14.2) which defines a time point of a signal jump (3) in the transmitted signal (Sa1) by a zero passage (22) in a time range (31);

a second delay element (10), responsive to the transmitted signal (Sa1), that generates on an output a second delay time (Tv10) on a second delay output signal (Sa4);

a third delay element (11), having an input (11.1) responsive to the second delay output signal (Sa4) of the second delay element, and that generates on an output (11.2) a third delay time (Tv11) on a third delay output signal (Sa5), located downstream of the second delay element (10); and a signal fade over circuit (12 or 35), connected between the input (11.1) and the output (11.2) of the third delay element (11), having signal transmission positions (12.0, 12.1, 12.2) which are controllable by the control signal (S14), wherein a short time before the time point of a signal jump (3) the fade over circuit transmits the third delay output signal (Sa5) to the output (6) of the transmission path (9), and, immediately after the times point of a signal jump (3), the fade over circuit transmits the second delay output signal (Sa4) to the output (6), while, at other times when there is no control signal, the fade over circuit forms an average value from the second delay output signal (Sa4) and the third delay output signal (Sa5), and this average value signal is then available at the output (6) of the transmission path (9), characterized in that the first delay time (Tv15) of the first delay element (15) is such that the front slope (24) of the second detector signal (S18) of the second detector (18), produced when a slope (4) of the transmitted signal (Sa1) is detected, is at least partially located in the time range (T25) of the trailing edge (25) of the corresponding first detector signal (S17) of the first detector (17), that the second delay time (Tv10) of the second delay element (10) is designed so that the end (29) of the signal slope (4) of the second delay output signal (Sa4) is within the time range (31) of the zero passage (22) of control signal (S14), and that the third delay time (Tv11) of the third delay element (11) is equal to half the period (T5) of the overshoot (5)

superimposed on the transmitted signal (Sa1), and following the signal slope (4) of the transmitted signal.

2. An anti-distortion device as in claim 1, characterized in that the delay elements are delay lines.

3. An anti-distortion device as in claim 1, characterized in that the second signal jump detector (18) contains a fourth delay element (33) responsive to the first delay output signal (Sa2) of the first delay element and that generates a fourth delay time (Tv33) on a fourth delay output signal (Sa3), wherein the fourth delay element is located in the signal path of the second signal jump detector, and wherein the first signal jump detector (17) further includes a second signal subtracter (34), and the second signal jump detector (18) further includes a third signal subtracter (34), each signal subtracter having inputs and an output, with one of the inputs (34.1) of the second signal subtracter connected to the input (15.1) of the first delay element (15), and the other input (34.2), of the second signal subtracter connected to the output (15.2) of said first delay element (15), wherein one of the inputs (34.1) of the third signal subtracter is connected to the input (33.1) of the fourth delay element (33), and the other input (34.2) of the third signal subtracter is connected to the output (33.2) of said fourth delay element (33); and wherein the delay time (Tv15, Tv33) of the first and fourth delay elements (15, 33) each have a duration that is substantially identical to the slope duration (T4) of a signal slope (4) of the transmitted signal (Sa1) produced by the transmitting device (2) at a signal jump (3).

4. An anti-distortion device as in claim 1, characterized in that the signal fade over circuit (12) is an adjustable electronic potentiometer (35).

5. An anti-distortion device as in claim 1, characterized in that the signal fade over circuit (12) includes a resistor circuit (16) having two resistors connected in series at a center tap (16.0) and wherein the fade over circuit further includes a three-position signal switch, whose two end positions (12.1, 12.2) are connected to the ends of the resistor circuit (16), and whose center position (12.0) is connected to the center tap (16.0) of the resistor circuit (16).

6. An anti-distortion device as in claim 1, characterized in that a symmetrical threshold switch (44) is connected downstream of the output of signal subtracter (19), which only allows the parts of the control signal (S14) of the signal subtracter to pass, whose level is larger than the blocking level (p0) of the threshold switch.

7. An anti-distortion device as in claim 3, characterized in that a chain (38) of four equal series-connected delay elements (38.1 to 38.4) is connected downstream of the transmitting device (2), whose delay time (Tv38) is one quarter of the period (T5) of the overshoot (5) of the transmitted signal (Sa1), of which the first signal jump detector (17) is connected to the series connection of the first two delay elements (38.1 and 38.2) of the chain of delay elements, the second signal jump detector (18) is connected to the series connection of the last two delay elements (38.3 and 38.4) of the chain of delay elements, and the signal fade over circuit (12) is connected to the series connection of the two center delay elements (38.2, 38.3) of the chain of delay elements.

8. An anti-distortion device as in claim 1, characterized in that the delay elements are lag elements.

9. An anti-distortion device as in claim 1, characterized in that the delay elements are high pass circuits.

10. An anti-distortion device as in claim 1, characterized in that the delay elements are low pass circuits.

* * * * *